(12) United States Patent
Green et al.

(10) Patent No.: US 9,939,263 B2
(45) Date of Patent: Apr. 10, 2018

(54) GEODETIC SURVEYING SYSTEM

(71) Applicant: LEICA GEOSYSTEMS AG, Heerbrugg (CH)

(72) Inventors: Alastair Green, Rebstein (CH); Andreas Daubner, St. Gallen (CH); Paul Dainty, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 376 days.

(21) Appl. No.: 14/938,721

(22) Filed: Nov. 11, 2015

(65) Prior Publication Data
US 2016/0138915 A1 May 19, 2016

(30) Foreign Application Priority Data

Nov. 14, 2014 (EP) ..................... 14193203

(51) Int. Cl.
*G01C 3/08* (2006.01)
*G01C 15/00* (2006.01)
(52) U.S. Cl.
CPC ............. *G01C 3/08* (2013.01); *G01C 15/002* (2013.01)
(58) Field of Classification Search
CPC .................................. G01C 3/08; G01C 15/002
See application file for complete search history.

(56) References Cited

U.S. PATENT DOCUMENTS

| | | | |
|---|---|---|---|
| 5,886,340 A | 3/1999 | Suzuki et al. | |
| 5,988,862 A * | 11/1999 | Kacyra | G01B 11/002 382/195 |
| 6,922,234 B2 * | 7/2005 | Hoffman | G01C 3/08 356/141.1 |
| 7,583,373 B2 | 9/2009 | Schwarz | |
| 7,804,051 B2 | 9/2010 | Hingerling et al. | |
| 9,758,239 B2 | 9/2017 | Metzler et al. | |

(Continued)

FOREIGN PATENT DOCUMENTS

CN 103477187 A 12/2013
DE 197 107 22 A1 10/1997
(Continued)

OTHER PUBLICATIONS

European Search Report dated Jun. 2, 2015 as received in Application No. EP 14 19 3203.

*Primary Examiner* — Eric L Bolda
(74) *Attorney, Agent, or Firm* — Maschoff Brennan

(57) ABSTRACT

Some embodiments of the invention include a surveying system having a position determination unit such as, for example, a total station or a GNSS module, for determining a target position in a defined coordinate system, and having a mobile target unit for definition and/or position determination of target points in the coordinate system. In some embodiments, the surveying system may be adapted to capture and/or receive image data that is related to a task image. In some embodiments, the surveying system may include a control unit for allowing a user to control surveying tasks of the surveying system in order to acquire surveying task data that is related to the surveying tasks and comprises spatial coordinates of at least one target point, a data storage unit for storing the surveying task data, and an electronic graphical display for displaying a visualization of the surveying task data.

21 Claims, 5 Drawing Sheets

(56) References Cited

U.S. PATENT DOCUMENTS

| | | | |
|---|---|---|---|
| 9,772,185 | B2 | 9/2017 | Metzler |
| 9,816,813 | B2 * | 11/2017 | Lettau .................. G01C 15/002 |
| 2004/0234123 | A1 | 11/2004 | Shirai et al. |
| 2012/0166137 | A1 | 6/2012 | Grässer et al. |
| 2013/0253822 | A1 | 9/2013 | Fortune et al. |
| 2014/0163775 | A1 | 6/2014 | Metzler |

FOREIGN PATENT DOCUMENTS

| | | |
|---|---|---|
| DE | 19926706 A1 | 12/1999 |
| DE | 19949580 A1 | 4/2000 |
| EP | 0 892 245 A2 | 1/1999 |
| EP | 1 686 350 A1 | 8/2006 |
| EP | 1686350 A1 | 8/2006 |
| EP | 1 734 336 A1 | 12/2006 |
| EP | 1 573 271 B1 | 2/2008 |
| EP | 2 511 781 A1 | 10/2012 |
| WO | 2015/169338 A1 | 11/2015 |

\* cited by examiner

GEODETIC SURVEYING SYSTEM

FIELD

The invention relates to a surveying system having a position determination unit, in particular a theodolite or a total station, for determining a target position in a defined coordinate system, and having a mobile target unit, equipped with a surveying pole, for definition and/or position determination of target points in a defined coordinate system.

BACKGROUND

Various geodetic surveying apparatuses have been known since ancient times for surveying one or more target points. In this case, as a standard, spatial data, distance and direction, or angle from a measuring apparatus to the target point to be surveyed are recorded. In particular, the absolute position of the measuring apparatus is acquired together with possibly existing reference points.

Widely known examples of such geodetic surveying apparatuses comprise theodolites, tachymeters or total stations, which are also referred to as electronic tachymeters or computer tachymeters. A geodetic surveying instrument of the prior art is described, for example, in the publication document EP 1 686 350. Such apparatuses have electro sensor angle and distance measurement functions, which allow determination of direction and distance to a selected target. The angle and distance quantities are in this case determined in the internal reference system of the apparatus and, for an absolute position determination, may possibly also need to be correlated with an external reference system.

In many geodetic applications, points are surveyed by placing specially configured target objects at them. These usually consist of a pole having a targetable marking or a reflector for defining the measurement distance, or the measurement point. Using a central geodetic surveying apparatus, even a relatively large number of target objects can therefore be surveyed, although this requires that they be identified. In such surveying tasks, in order to control the measurement process and establish or register measurement parameters, various data, instructions, words and other information need to be transmitted between the target object—in particular a handholdable data acquisition apparatus at the target object—and the central measuring apparatus. Examples of such data are the identification of the target object, inclination of the pole, height of the reflector above ground, reflector constants or measurement values such as temperature or air pressure.

Modern total stations have microprocessors for the digital post-processing and storage of acquired measurement data. The apparatuses are generally produced in a compact and integrated design, usually with coaxial distance and angle measurement elements as well as calculation, control and storage units integrated in an apparatus. Depending on the development level of the total station, means for motorizing the target optics, for reflectorless distance measurement, for automatic target search and tracking and for remote control of the entire apparatus are integrated. Total stations known from the prior art furthermore have a radio data interface for setting up a radio link to external peripheral components, for example to a data acquisition apparatus which, in particular, may be formed as a hand-holdable data logger, remote control unit, array processor, notebook, small computer or PDA. By means of the data interface, measurement data acquired and stored by the total station can be output to external post-processing, externally acquired measurement data can be read into the total station for storage and/or post-processing, remote control signals for remote control of the total station or of another external component, particularly in mobile field use, can be input or output, and control software can be transferred into the total station.

For sighting or targeting the target point to be surveyed, geodetic surveying apparatuses according to the generic type comprise, for example, a target telescope, for example an optical telescope, as a sighting device. The target telescope can generally be rotated about a vertical axis and about a horizontal tilt axis relative to a base of the measuring apparatus, so that the telescope can be oriented towards the point to be surveyed by swivelling and tilting. In addition to the optical viewing channel, modern apparatuses often have a camera integrated in the target telescope, and for example oriented coaxially or parallel, for acquiring an image, in which case the acquired image may in particular be represented as a live image on the display of the display/control unit and/or on a display of the peripheral apparatus used for the remote control—for example of the data logger or the remote control unit. The optics of the sighting device may in this case have a manual focus—for example an adjustment screw for changing the position of focusing optics—or an autofocus, the focal position being changed for example by servo motors. Automatic focusing devices for target telescopes of geodetic apparatuses are known, for example, from DE 197 107 22, DE 199 267 06 or DE 199 495 80.

Particularly, the sighting of a target reflector may in this case be carried out by means of a live image, which is displayed to the user in the display of the data logger or of the remote control unit, which is provided by a camera—for example arranged coaxially in the target telescope or with an orientation parallel to the target telescope—as the sighting device of the total station. Accordingly, the user can orientate the total station with the aid of the live image in accordance with the desired target identifiable in the live image.

EP 1 734 336 discloses a surveying system comprising a target unit, which has a reflector and an optical receiver and transmitter. It is in this case proposed to use the optical transmitter of the target unit inter alia to assist the automatic target search process. Thus, after reception of the search or measurement radiation, the target object can communicate its own identification, for example the reflector number or the reflector type, back to the surveying station with the aid of the transmitter of the target unit. The surveying station can therefore identify the target object found and be configured optimally with respect to the target object.

EP 1 573 271 discloses a target unit also having an optical transmitter, wherein—after reception of measurement radiation of a surveying apparatus—the target unit sends back an optical signal on which the target unit's own identity is modulated. A feature common to the aforementioned surveying systems from the prior art is that, optionally with the use of a camera, the target unit or a surveying pole provided with the target unit is sighted or observed by a stationary position determination unit, for example a total station.

For controlling the surveying system, the user is provided a control unit—either fixedly connected to the surveying apparatus or the target unit or embodied as a handholdable remote control unit. Such control units comprise input means and output means, particularly embodied as a display or touch screen, and data processing and storing means for processing and storing surveying data.

The user can have the surveying data be visualized on the display. If there is surveying data of more than one surveying task stored in the control unit, the surveying tasks may be shown in a list, e. g. sorted by a file name or a date, and the user can select the surveying task, the data of which he wants to be output by the device. If there is data of many surveying tasks stored, disadvantageously, it can become difficult and time-consuming for the user—especially in the field—to remember the correct file name related to the requested surveying data.

SUMMARY

Some embodiments of the invention include an improved surveying system and/or an improved method, facilitating the selection of an existing set of surveying task data from a list.

Some embodiments of the invention provide such a surveying system and such a method that allow a user to easier and faster distinguish the surveying tasks in a list on the control device of a surveying system.

A first aspect of the invention relates to a surveying system having a position determination unit, in particular a total station or a GNSS module, for determining a target position in a defined coordinate system, and having a mobile target unit for definition and/or position determination of target points in the coordinate system. The surveying system comprises a control unit for allowing a user to control surveying tasks of the surveying system in order to acquire surveying data that is related to the surveying tasks and comprises spatial coordinates of at least one target point. The control unit comprises a processor unit for processing the surveying data, a data storage unit for storing the surveying data, and an electronic graphical display for displaying a visualization of the surveying data to the user. According to the invention, the surveying system is adapted to capture and/or receive image data that is related to a task image, the data storage unit is adapted to store the image data, the processor unit is adapted to assign the image data to a surveying task, and the control unit is adapted to visualize on the display a surveying task list comprising a multitude of surveying tasks, wherein each of the surveying tasks is represented by a task image.

In one embodiment, the surveying system comprises a digital camera that is adapted to capture the image data. In a particular embodiment, the digital camera is adapted to capture the image data fully automatically during a surveying task. In another particular embodiment, the digital camera is adapted to capture the image data upon a user command, particularly wherein the control unit is adapted to generate a respective optical and/or acoustical reminder for the user during a surveying task.

In another embodiment of the surveying system according to the invention, the control unit comprises a data input unit that allows receiving the image data from an external device, the data input unit particularly being a USB port, a card reader or a wireless communication means.

In one embodiment of the surveying system according to the invention, the control unit is adapted to assign the image data to the respective surveying task fully automatically.

In another embodiment of the surveying system according to the invention, the control unit is adapted to assign the image data to the respective surveying task upon a user command.

In yet another embodiment of the surveying system according to the invention, the control unit is adapted to assign the image data to the respective surveying task upon a user selection, particularly wherein the control unit is adapted to display on the display a plurality of selectable images to the user.

In a further embodiment of the surveying system, the control unit is a hand-held remote control unit, particularly comprising a digital camera module that is adapted to capture the image data, and/or being attachable to the target unit.

Advantageously, the hand-held remote control unit is a rugged field device comprising impact-absorbing protectors, a splash-proof and dust-proof housing, and/or shock-resistant electronic components.

In another embodiment of the surveying system the control unit is a fixed control unit that is attached to the position determination unit.

In one embodiment of the surveying system according to the invention, the position determination unit comprises
  a targeting device, in particular telescope, wherein the targeting device is pivotable in a motorized manner relative to a base of the position determination unit for the purpose of changing the alignment of said targeting device and has at least one objective unit that defines an optical target axis,
  angle measuring functionality for high-precision acquisition of the alignment of the target axis, and
  evaluation means for data storage and control of the alignment of the targeting device.

In a special embodiment, the position determination unit is an imaging total station and the targeting device comprises a digital camera that is adapted to capture the image data.

In another embodiment of the surveying system according to the invention, the target unit comprises
  a surveying pole, the lower end of which can be brought into contact with a target point, and
  a target which can be fitted on the surveying pole and the target position of which can be determined with high precision.

In particular, the target is formed as a surveying reflector which can be surveyed with the aid of a total station or as a GNSS antenna having a data link to a GNSS module of the position determination unit. The GNSS antenna and the GNSS module can being provided in a common GNSS unit which can be fitted on the surveying pole.

In a further embodiment of the surveying system according to the invention, the target unit comprises a camera module that is adapted to capture the image data.

In one embodiment of the surveying system, the task images task images comprise at least
  a digital photography, wherein the image data is captured by a camera of the surveying system during a surveying task,
  a graph, a chart or a diagram visualizing surveying data, in particular wherein the image data is created or composed by the user by means of the control unit or automatically by a processor unit of the control unit, or
  a symbol for a location related to the surveying task, in particular wherein the image data is provided by an external device.

In another embodiment of the surveying system, the visualization of the task image is a reduced-size image, particularly a thumbnail image or an image having a size of between about 120×80 pixels and about 600×400 pixels and/or less than 500 kilobytes, in particular less than 200 kilobytes.

Another aspect of the invention relates to a method for providing a visualization of surveying data associated with a surveying task on a display of a control unit of a surveying system to a user. The method comprises performing a plurality of surveying tasks, in the course of each surveying task determining spatial coordinates of at least one surveying point with the surveying system, storing surveying data related to each of the surveying tasks in a storing unit of the control unit, storing image data related to task images, each of which being associated with one surveying task and/or being assignable to one surveying task by the user, and visualizing on the display a surveying task list comprising a multitude of surveying tasks, wherein each of the surveying tasks is represented by a task image.

In one embodiment of this method, the task image is a digital photography, wherein the image data is captured by a camera of the surveying system during a surveying task.

In another embodiment of this method, the task image is a graph, chart or diagram visualizing surveying data, in particular wherein the image data is created or composed by the user by means of the control unit or automatically by a processor unit of the control unit.

In yet another embodiment of this method, the task image is a symbol for a location related to the surveying task, in particular wherein the image data is provided by an external device.

In another embodiment of the method according to the invention, capturing the image data with a camera of the surveying system is performed fully automatically during a surveying task, and/or upon a user command, particularly wherein a respective optical and/or acoustical reminder for the user is generated during a surveying task.

In a further embodiment of the method according to the invention, the image data is provided by an external device. Particularly, the control unit comprises a data input unit allowing receiving the image data from the external device, the data input unit particularly being a USB port, a card reader or a wireless communication means.

In one embodiment, the control unit assigns the image data to the respective surveying task fully automatically.

In another embodiment, the control unit assigns the image data to the respective surveying task upon a user command.

In yet another embodiment, the control unit assigns the image data to the respective surveying task upon a user selection, particularly wherein on the display a plurality of selectable images is displayed to the user.

Another aspect of the invention relates to a computer programme product, comprising programme code which is stored on a machine-readable medium, or being embodied by an electromagnetic wave comprising a programme code segment, and having computer-executable instructions for performing, in particular when run on a control unit of a mobile surveying system according to the first aspect of the invention, the following steps of the method according to the invention:

storing surveying data related to each of the surveying tasks in a storing unit of the control unit, storing image data related to task images, each of which being associated with one surveying task and/or being assignable to one surveying task by the user, and visualizing on the display a surveying task list comprising a multitude of surveying tasks, wherein each of the surveying tasks is represented by a task image.

BRIEF DESCRIPTION OF THE FIGURES

The invention in the following will be described in detail by referring to an example embodiments that are accompanied by figures, in which.

DETAILED DESCRIPTION

Figure 1:
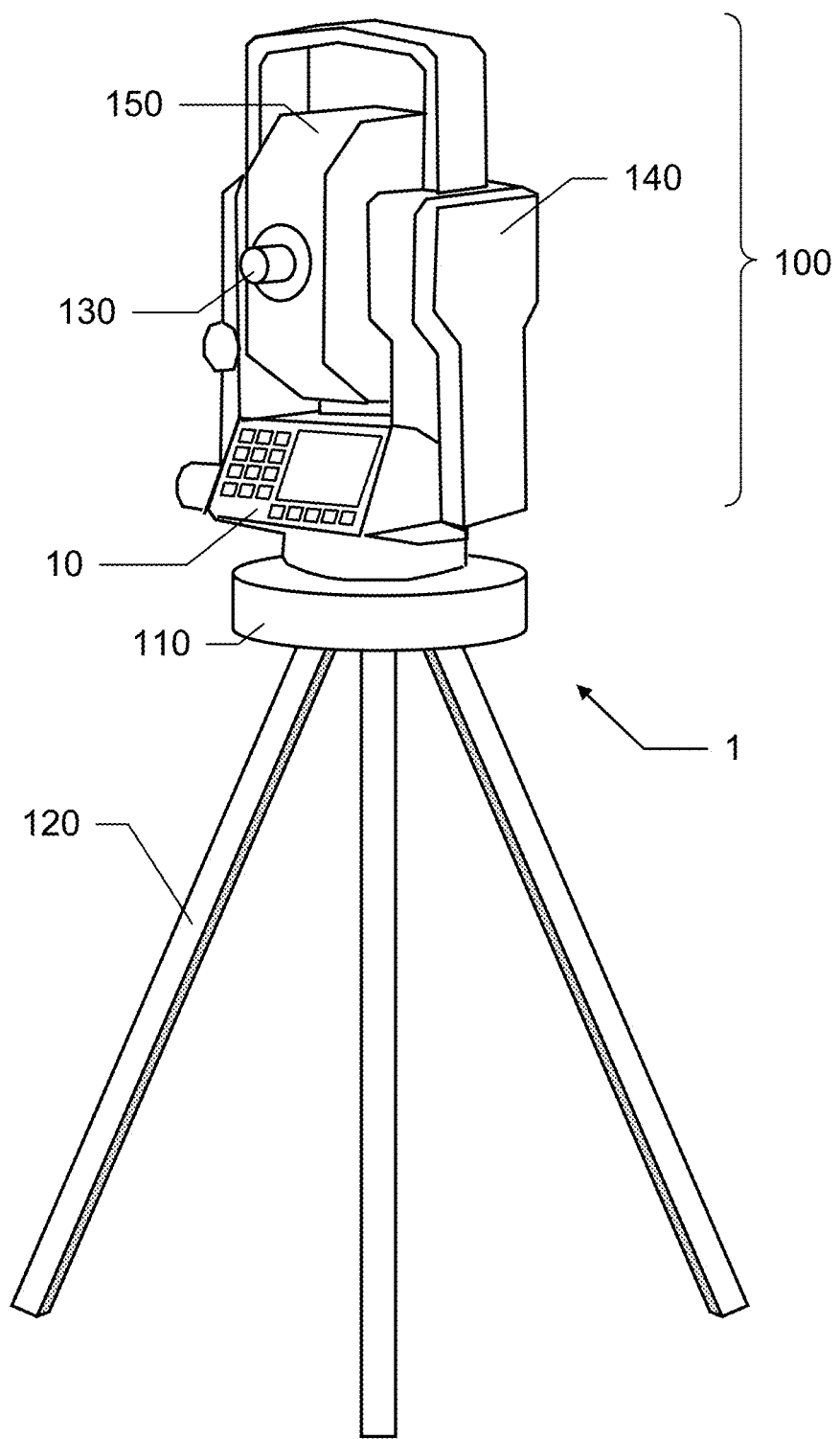
FIG. 1 shows a total station as an example embodiment of a position determination unit of a surveying system according to the invention.

FIG. 1 shows a position determination unit 1 of a surveying system according to the invention that is designed as a total station and serves for measuring horizontal angles, vertical angles and distances with respect to a remote target object.

The total station is arranged on a stand 120, wherein a base 110 of the total station is directly and fixedly connected to the stand. The main body of the total station, which is also designated as the upper part 100, is rotatable about a vertical axis relative to the base 110. In this case, the upper part 100 has a support 140, formed e. g. by two columns, a sighting device 150, for example a telescope, which is mounted in a manner rotatable about the horizontal tilting axis between the columns, and an electronic display control unit 10. The display control unit 10 can be designed in a known manner for controlling the measuring appliance 1 and for processing, displaying and storing measurement data.

The sighting device 150 is arranged on the support 140 in a manner rotatable about a horizontal tilting axis and can thus be pivoted or tilted horizontally and vertically relative to the base 110 for alignment with a target object. Motors (not illustrated here) are present for carrying out necessary pivoting and tilting movements for the alignment of the sighting device. The sighting device 150 can be embodied as a common sighting device structural unit, wherein an objective, a focusing optical system, a coaxial camera sensor, the eyepiece 130 and a graphics processor can be integrated in a common sighting device housing. By means of the sighting device 150, the target object can be targeted and the distance between the total station and the target object can be acquired in an electrical-sensor-based manner. Furthermore, provision is made of means for the electrical-sensor-based acquisition of the angular alignment of the upper part 100 relative to the base 110 and of the sighting device 150 relative to the support 140. These measurement data acquired in an electrical-sensor-based manner are fed to the display control unit 10 and processed by the latter, such that the position of the target point relative to the total station can be determined, optically displayed and stored by the display control unit 10.

Figure 2:
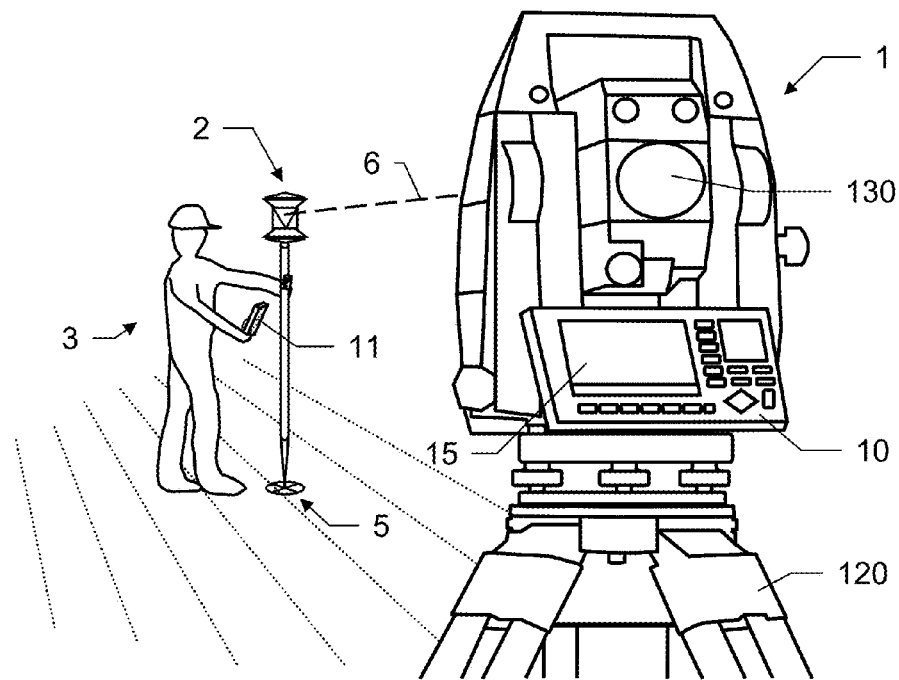
FIG. 2 shows an example embodiment of a surveying system comprising a control unit.

FIG. 2 shows a surveying system according to the invention comprising a position determination unit 1 that is designed as a total station and a target unit 2.

The target unit 2 comprises a surveying pole, the lower end of which can be brought into contact with a target point 5, and a target formed as a surveying reflector which can be fitted on the surveying pole, be surveyed with the aid of the total station 1, and the position of which can be determined with high precision. Alternatively, the target can be a GNSS antenna having a data link to a GNSS module of the position determination unit of the surveying system.

The total station 1 comprises a targeting device 150, in particular a telescope, which is pivotable in a motorized manner relative to a base 110 of the total station 1 in order to allow changing the alignment of said targeting device 150. The targeting device has an objective unit 130 that defines an optical target axis 6. The total station furthermore comprises angle measuring functionality for high-precision acquisition of the alignment of the target axis 6, and evaluation means for data storage and control of the alignment of the targeting device 150.

A control unit of the surveying system according to the invention can be provided as a fixed control unit 10 that is attached to the total station 1, as a hand-held remote control unit 11 or as comprising both two components. In all cases, the control unit 10,11 is adapted for controlling the total station 1 and data interchange with the total station 1. It comprises a displaying means 15, input means, and storing means for storing surveying data. In particular, the displaying means 15 and input means can be provided as a touch screen. If the control unit is provided as two components, the mobile component 11 can comprise the display and a small storing means (e. g. a flash memory), whereas the fixed component 10 can comprise storing means for storing larger quantities of data (e. g. a hard disk drive).

Figure 3:
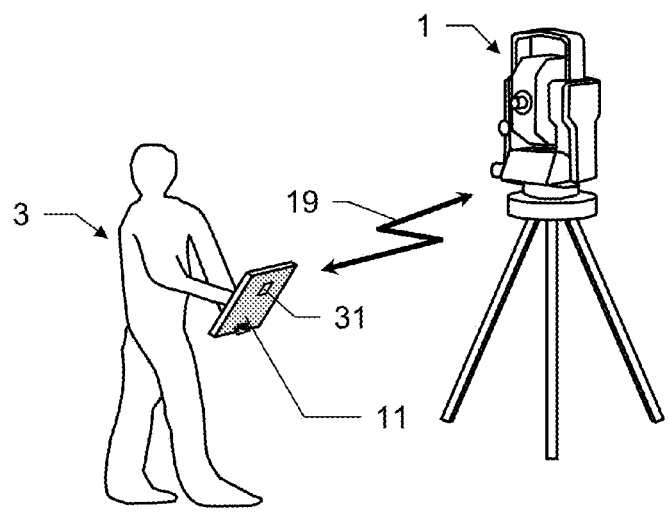
FIG. 3 shows a total station being controlled by a user via a hand-held remote control unit.

FIG. 3 shows a total station 1 being controlled by a user 3 via a cable-less hand-held remote control unit 11 which is connected to the total station 1 by means of a wireless data connection 19, e. g. a mobile broadband or short-wavelength radio link or a wireless local area network. The remote control 11 comprises an integrated digital camera 31, allowing the user 3 to take pictures of the surveying surrounding and of measurement points. As the remote control 11 is designed for outdoor application use with measuring and/or surveying equipment in the field, advantageously it is designed as a rugged field device, being sturdy and resistant to wetness and dust. For improved sturdiness the remote control 11 is, therefore, equipped with impact-absorbing protectors on its edges, a splash-proof and dust-proof housing, and electronic components that are shock-resistant to a certain degree.

Figure 4A:
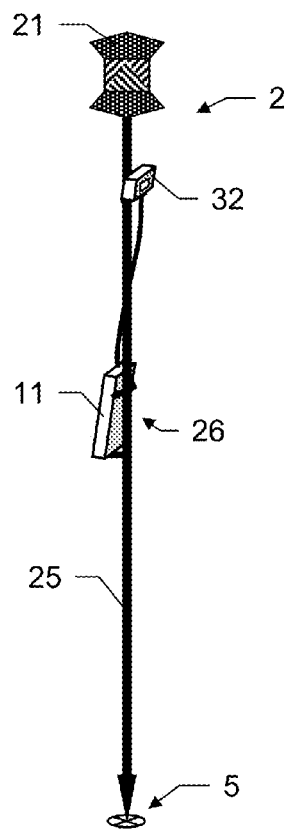
FIGS. 4a-b show two example embodiments of a target unit of a surveying system according to the invention.
Figure 4B:
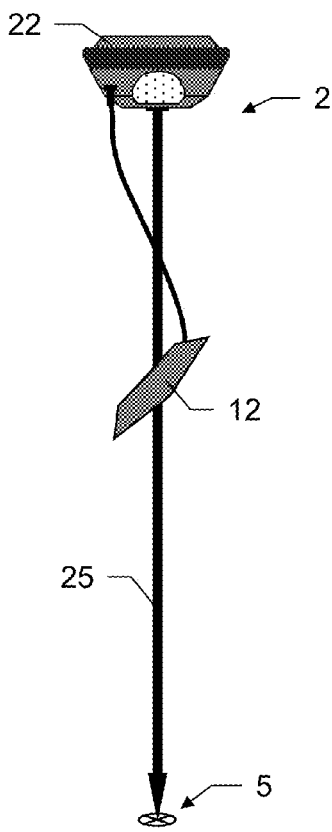

In FIGS. 4*a*-*b* two example embodiments of a target unit 2 of a surveying system according to the invention are shown. In both embodiments, the target unit 2 comprises a surveying pole 25 having a lower end that is adapted to be put in contact with a target point 5 the coordinates of which are to be determined. In both embodiments, a target 21,22 is placed on top of surveying pole 25, and the position of the target can be determined with high precision.

FIG. 4*a* shows a first embodiment, wherein the target is formed as a surveying reflector 21 which can be surveyed with the aid of a total station. The pole 25 comprises a mounting 26 for attaching a hand-held remote control unit 11 for controlling the surveying system. As shown in FIG. 3, the hand-held remote control unit 11 may comprise a camera module. Here, a separate camera module 32 is attached to the pole 25 and connected to the remote control unit 11 via a cable.

The camera module 32 of the target unit 2 can be used for capturing image data, e. g. of images depicting a target point 5 and its surrounding, particularly before or after placing the pole on the point 5, or a site of a surveying task.

FIG. 4*b* shows a second embodiment, wherein the target is formed as a GNSS antenna 22 having a data link to a GNSS module of the position determination unit of the surveying system. This embodiment of the target unit 2 comprises a control unit 12 that is designed as a part of the target unit 2 and attached to the surveying pole 25. It may be connected to the GNSS antenna 22 by means of a cable. Optionally, it may comprise a camera module.

Another embodiment of the target unit (not shown here) can also comprise a camera module having an optical recording device that is sensitive to light coming from all or many spatial directions. It could be based on an imaging sensor and a fish-eye lens, or a combination of a camera and a parabolic mirror, or a minimum of two single cameras arranged on a horizontal ring, or any other optical setup functioning as a wide-angle or panorama camera. Such camera modules are described e. g. in the application PCT/EP2014/059138. The camera module can be mounted on the pole together with the position measuring resource of the respective surveying system, or integrated into the housing of the GNSS antenna 22 or of the reflector 21, respectively.

Figure 5:
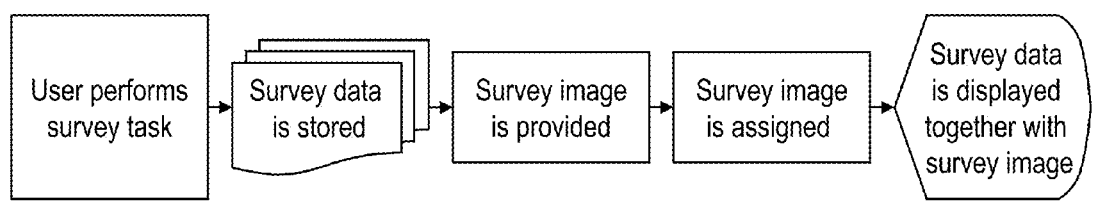
FIG. 5 shows a flowchart illustrating an example embodiment of a method according to the invention.

FIG. 5 shows a flowchart illustrating an example embodiment of a method according to the invention. According to this embodiment, the user performs one or more surveying tasks with a surveying system, in the course of each surveying task obtaining surveying data, e. g. comprising spatial coordinates of surveyed target points. This surveying data is stored in the control unit of the surveying system.

Then, an image is provided that is related to a surveying task. This image can be a digital photography, particularly having been captured by a camera of the surveying system during the respective surveying task. The image can also be a graphical representation such as a graph, chart or diagram visualizing the surveying data. For instance, the graphical representation can be created or composed by the user by means of the control unit or automatically by a processor unit of the control unit. Furthermore, the image can be a symbol for a location related to the surveying task, in particular be provided by an external device.

In a next step, the provided image (or its image data, respectively) is assigned to a surveying task, or to the surveying data of a surveying task, respectively. This assigning is performed by the processor unit of the control unit. The image data can be assigned to the respective surveying task by the processor unit fully automatically, particularly if the image data has been captured beforehand fully automatically during the surveying task. Alternatively, the image data can be assigned to the respective surveying task upon a command of the user, particularly if the image is a graphical representation prepared by the user or if the image is provided by an external device. Preferably, the image data can be assigned to the respective surveying task upon a user selection, particularly wherein the control unit displays a plurality of available images to the user.

When the images are assigned to the surveying tasks, the surveying data of the single surveying tasks can be provided to the user, wherein the images are used to represent the respective surveying task. This visualization helps the user to remember more quickly, which set of surveying data is assigned to a particular surveying task, the surveying data of which the user is looking for.

Instead of performing a surveying task in the first step, a user can upload data related to a finished surveying task. For instance, this can be stake out data of a construction site, and the surveying image can picture the construction site or a model of a building that is to be constructed.

Figure 6A:
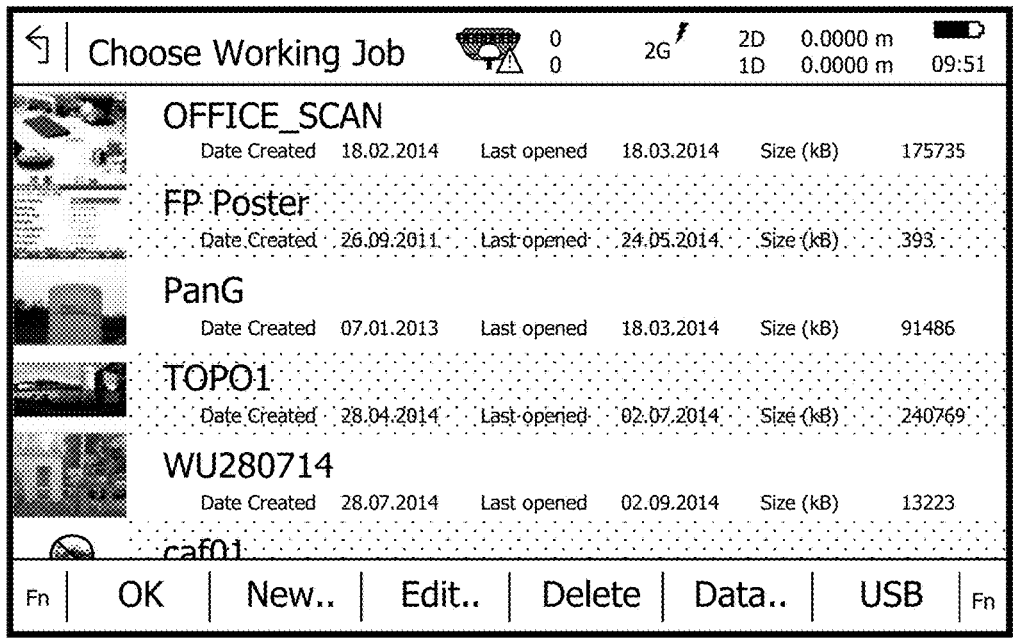
FIGS. 6a-c show visual outputs of a graphical display of a control unit of a surveying system according to the invention, the visual output comprising images, each of which being associated with a certain surveying task.
Figure 6B:
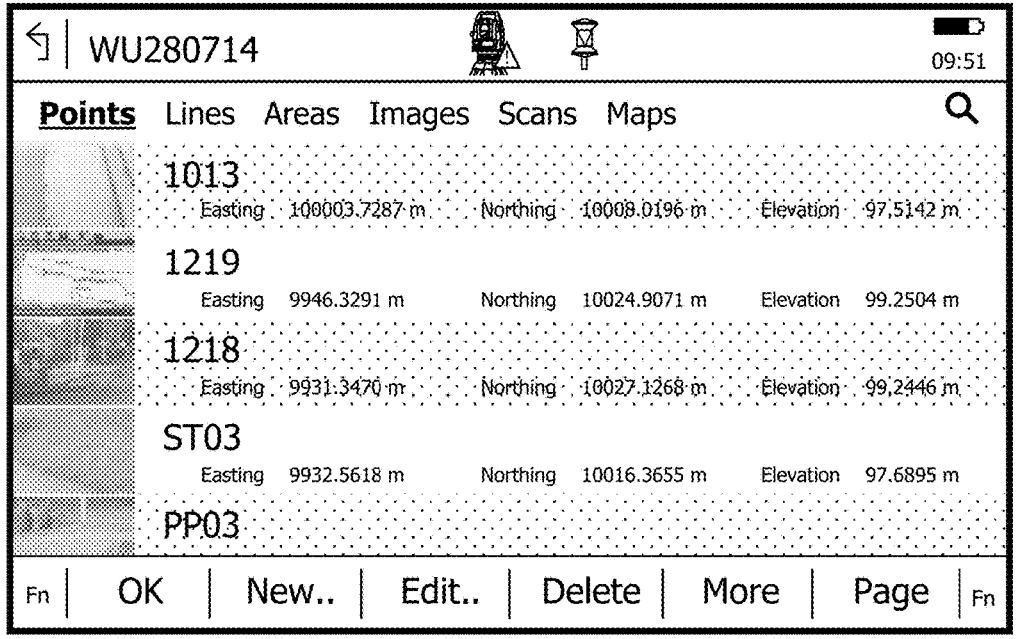
Figure 6C:
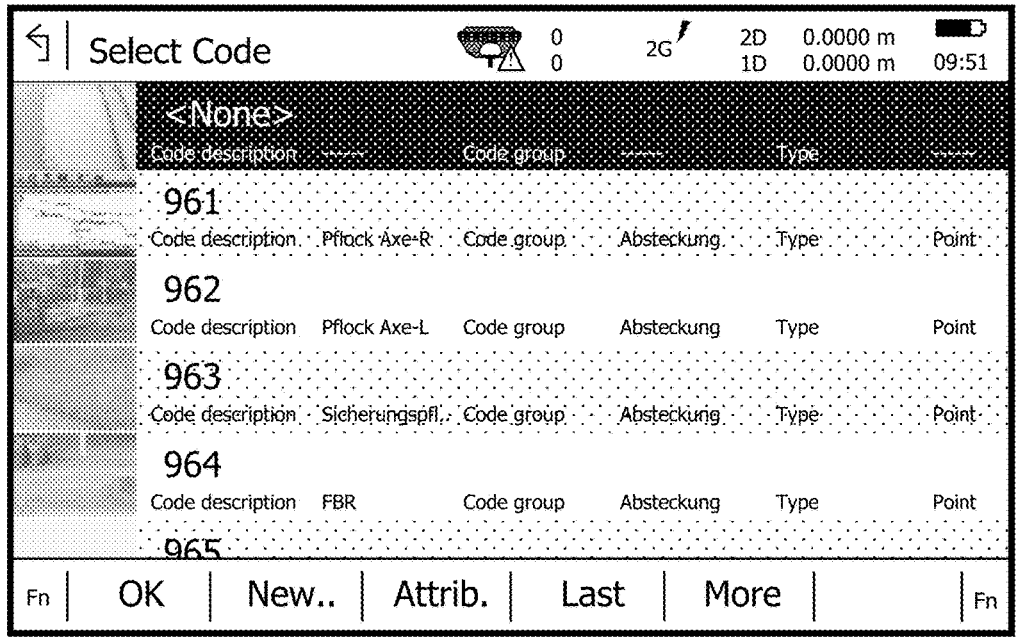

FIGS. 6*a*-*c* show the visual output of the displaying means 15 of a control unit 10,11 of a surveying system according to the invention, the visual output showing different task lists with images that are associated with a certain surveying task.

FIG. 6a shows a first "working job" list comprising a number of surveying tasks. These are visualized showing the respective title or file name ("OFFICE_SCAN", "FP Poster", "WU280714" etc.), the data of creation and of the last access, as well as the size of the file. As the user might not be able to remember the name given to the file containing the surveying data of a certain surveying task, according to the invention, images are also displayed that are associated with the surveying task.

In this example, the images are displayed on the left of the respective surveying task title of the list. They comprise photographies of the site of the respective surveying task and a chart associated with the respective surveying data. For the last surveying task in the list, no image is available; this is indicated by a crossed out camera symbol.

When the user scrolls up or down the task list, it might become necessary to visualize a large number of task images in short time. Therefore, the task images preferably are displayed as thumbnail images, i.e. reduced-size versions of the original task images. Typically, such thumbnail images have sizes ranging from about 75×75 pixels to about 250× 150 pixels. Also, thumbnail images can have a larger compression rate, so that they can have a size of less than 200 kilobytes, in particular less than 100 kilobytes. Of course, the reduced-sized images can also have sizes ranging between about 120×80 pixels and about 600×400 pixels and/or sizes of less than 500 kilobytes, in particular less than 200 kilobytes.

If the control unit has two components, e. g. one being a mobile device comprising the display and one being fixed to the surveying system and comprising the data storage unit for storing the images, the use of small thumbnail images reduces bandwidth and download time.

Preferably, when the user points on a thumbnail in the list, a larger thumbnail version or the original task image version can be displayed.

FIG. 6b shows a second "points" list comprising a number of coordinate data of target points of the surveying task "WU280714". These are visualized showing an identifier ("1013", "ST03" etc.) and the target points coordinates. In order to remind the user which target point is identified by which identifier, according to the invention also images are displayed that are associated with the target point. In this example, the images comprise photographies of the surrounding of the respective target point and a diagram associated with the respective surveying data.

FIG. 6c shows a third "code" list comprising a number of feature codes, each feature code standing for a certain stake out peg. Again, the items of the list are accompanied by images associated with these features. The user may add new entries to the list, thereby defining an image to accompany the entry.

Figure 7:
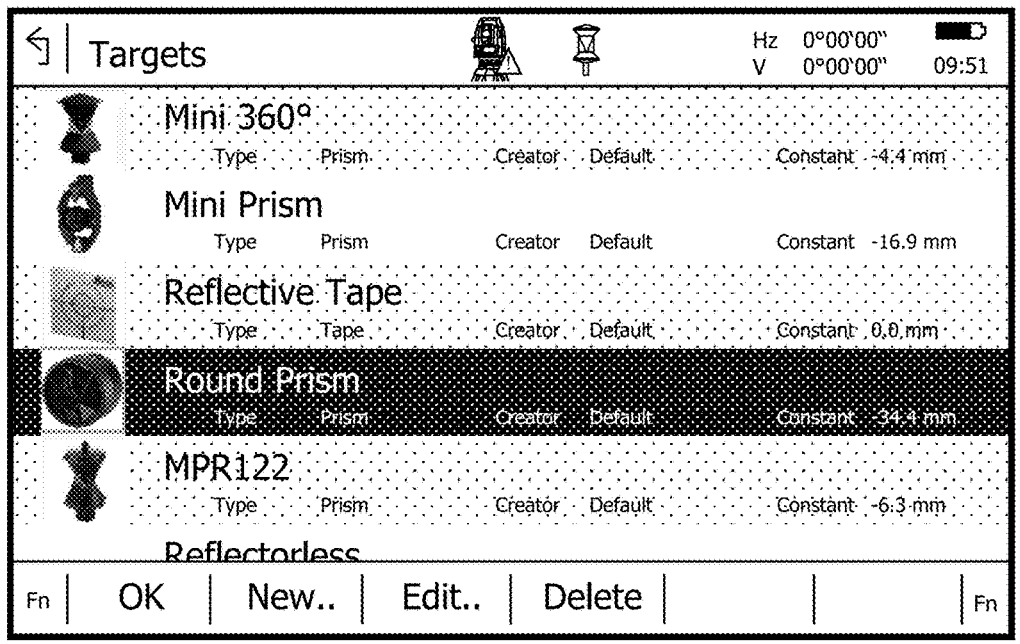
FIG. 7 shows a visual output comprising images, each of which being associated with a target type.

FIG. 7 shows a further visual output of the displaying means 15 of a control unit 10,11 of a surveying system according to the invention, the visual output showing a target list with images that are associated with a certain target type for use with the surveying system.

Although the invention is illustrated above, partly with reference to some preferred embodiments, it must be understood that numerous modifications and combinations of different features of the embodiments can be made. All of these modifications lie within the scope of the appended claims.

What is claimed is:

1. A surveying system having a position determination unit for determining a target position in a defined coordinate system, and having a mobile target unit for definition and/or position determination of target points in the coordinate system, wherein
the surveying system is adapted to capture and/or receive image data that is related to a task image,
the surveying system comprises a control unit for allowing a user to control surveying tasks of the surveying system in order to acquire surveying task data that is related to the surveying tasks and comprises spatial coordinates of at least one target point, and
the control unit comprises a processor unit for processing the surveying task data, a data storage unit for storing the surveying task data, and an electronic graphical display for displaying a visualization of the surveying task data to the user,
wherein:
the data storage unit is adapted to store the image data,
the processor unit is adapted to assign the image data to a set of surveying task data related to a surveying task, and
the control unit is adapted to visualize on the display a surveying task list comprising a multitude of surveying tasks that are selectable by a user, wherein upon a selection, surveying task data of the selected surveying task is provided to the user, and wherein each of the surveying tasks is represented by a title of the surveying task and by a visualization of a task image.

2. The surveying system according to claim 1, further comprising a digital camera that is adapted to capture the image data fully automatically during a surveying task, wherein the digital camera is adapted to fully automatically capture a multitude of image data sets during the surveying tasks.

3. The surveying system according to claim 1, further comprising a digital camera that is adapted to capture the image data upon a user command, wherein the control unit is adapted to generate a respective optical and/or acoustical reminder for the user during a surveying task.

4. The surveying system according to claim 1, wherein the control unit comprises a data input unit that allows receiving the image data from an external device, the data input unit particularly being a USB port, a card reader, a disk drive or a wireless communication means.

5. The surveying system according to claim 1, wherein:
the control unit is adapted to assign the image data to the respective surveying task:
fully automatically,
upon a user command, or
upon a user selection, wherein the control unit is adapted to display on the display a plurality of selectable images to the user.

6. The surveying system according to claim 1, wherein the control unit is a hand-held remote control unit being a rugged field device comprising impact-absorbing protectors, a splash-proof and dust-proof housing, and/or shock-resistant electronic components.

7. The surveying system according to claim 1, wherein the control unit is a hand-held remote control unit comprises a digital camera module that is adapted to capture the image data.

8. The surveying system according to claim 1, wherein the control unit is a hand-held remote control unit being attachable to the target unit.

9. The Surveying system according to claim 1, wherein the control unit is a fixed control unit that is attached to the position determination unit.

10. The surveying system according to claim 1, wherein the position determination unit comprises:
a targeting device, in particular telescope, wherein the targeting device is pivotable in a motorized manner relative to a base of the position determination unit for the purpose of changing the alignment of said targeting device and has at least one objective unit that defines an optical target axis,
angle measuring functionality for high-precision acquisition of the alignment of the target axis, and
evaluation means for data storage and control of the alignment of the targeting device,
wherein the position determination unit is an imaging total station and the targeting device comprises a digital camera that is adapted to capture the image data.

11. The surveying system according to claim 1, wherein the target unit comprises:
a surveying pole, the lower end of which can be brought into contact with a target point, and
a target which can be fitted on the surveying pole and the target position of which can be determined with high precision, wherein the target is formed as a surveying reflector which can be surveyed with the aid of a total station.

12. The surveying system according to claim 1, wherein the target unit comprises:
a surveying pole, the lower end of which can be brought into contact with a target point, and
a target which can be fitted on the surveying pole and the target position of which can be determined with high precision, wherein the target is formed as a GNSS antenna having a data link to the position determination unit which is embodied as a GNSS module, the GNSS antenna and the GNSS module particularly being provided in a common GNSS unit which can be fitted on the surveying pole.

13. The surveying system according to claim 1, wherein the target unit comprises a camera module that is adapted to capture the image data.

14. The surveying system according to claim 1, wherein the task images comprise
a digital photography, wherein the image data is captured by a camera of the surveying system during a surveying task,
a graph, a chart or a diagram visualizing surveying data, in particular wherein the image data is created or composed by the user by means of the control unit or automatically by a processor unit of the control unit, or
a symbol for a location related to the surveying task, in particular wherein the image data is provided by an external device.

15. The surveying system according to claim 14, wherein:
a visualization of the task image is a reduced-size image, particularly a thumbnail image or an image having a size of
between about 120×80 pixels and about 600×400 pixels and/or
less than 500 kilobytes.

16. The surveying system according to claim 15, wherein the image has a size less than 200 kilobytes.

17. A method for providing a visualization of surveying task data associated with a surveying task to a user on a display of a control unit of a surveying system, the surveying system particularly according to any one of the preceding claims, the method comprising:
storing a plurality of surveying task data sets in a storing unit of the control unit, each set comprising surveying task data related to a surveying task,
capturing image data with a digital camera of the surveying system and/or transferring image data to a storing unit of the control unit, the image data being related to a task image, each of which being associated with one set of surveying task data and/or being assignable to one set of surveying task data by the user,
assigning the image data to the sets of surveying task data, and
visualizing on the display a surveying task list comprising a multitude of surveying tasks that are selectable by a user, wherein upon a selection, surveying task data of the selected surveying task is provided to the user, and wherein each of the surveying tasks is represented by a title of the surveying task and by a visualization of a task image.

18. The method according to claim 17, further comprising capturing the image data with a camera of the surveying system:
fully automatically during a surveying task, and/or
upon a user command, wherein a respective optical and/or acoustical reminder for the user is generated during a surveying task.

19. The method according to claim 17, wherein the image data is provided by an external device, wherein the control unit comprises a data input unit allowing to receive the image data from the external device, the data input unit particularly being a USB port, a card reader or a wireless communication means.

20. The method according to claim 17, wherein the control unit assigns the image data to the respective surveying task:
fully automatically,
upon a user command, or
upon a user selection, wherein on the display a plurality of selectable images is displayed to the user.

21. A non-tangible computer program product, comprising program code which is stored on a machine-readable medium, or being embodied by an electromagnetic wave comprising a programme code segment, and having computer-executable instructions for performing the following process on a control unit of a mobile surveying system:
storing a plurality of surveying task data sets in a storing unit of the control unit, each set comprising surveying task data related to a surveying task,
capturing image data with a digital camera of the surveying system and/or transferring image data to a storing unit of the control unit, the image data being related to a task image, each of which being associated with one set of surveying task data and/or being assignable to one set of surveying task data by the user,
assigning the image data to the sets of surveying task data, and
visualizing on the display a surveying task list comprising a multitude of surveying tasks that are selectable by a user, wherein upon a selection, surveying task data of the selected surveying task is provided to the user, and wherein each of the surveying tasks is represented by a title of the surveying task and by a visualization of a task image.

* * * * *